Feb. 24, 1970  D. G. TIPOTSCH  3,497,302
RATIO RECORDING SPECTROPHOTOMETER
Filed May 11, 1966  2 Sheets-Sheet 1

INVENTOR.
DONALD G. TIPOTSCH
BY
*Paul R. Harder*
ATTORNEY

United States Patent Office 3,497,302
Patented Feb. 24, 1970

3,497,302
RATIO RECORDING SPECTROPHOTOMETER
Donald George Tipotsch, Sunnyvale, Calif., assignor to Beckman Instruments, Inc., a corporation of California
Filed May 11, 1966, Ser. No. 549,359
Int. Cl. G01j 3/42; G01d 5/36
U.S. Cl. 356—93                                          4 Claims

ABSTRACT OF THE DISCLOSURE

There is disclosed a double beam spectrophotometer which provides an indication of the transmittance of radiant energy from an external source through a sample without error due to differing levels of radiation within the reference and sample beam paths. Radiation from a source is directed alternately along a reference and sample beam path by a beam switcher which comprises a mask, an open segment, a second mask, an open segment, a mirrored segment and an open segment equally spaced and of equal width. A beam recombiner is utilized and comprises a rotating half mirror. The beam switcher and beam recombiner are phased in such a manner that alternate reference and sample radiation pulses, separated by equal dark intervals are provided at the detector. The reference and sample channels are connected to the detector during the respective pulses and for at least a portion of the associated dark interval on each side thereof and the resultant output signal in each channel demodulated to provide a direct current reference and sample signal having amplitudes proportional to the intensity of the radiation passing the respective channels whereby electrical signals representing the true value of the radiation passing the reference and sample beam paths are indicated as departures from background energy in that path.

---

This invention relates generally to spectrophotometers of the ratio recording type and more particularly to a ratio recording double beam spectrophotometer which provides an indication of the transmittance of radiant energy from an external source through the sample without error due to differing levels of radiance within the reference and sample beam paths that is not due to radiation from the external source.

In present day spectrophotometers the radiant energy detector produces an electrical output signal proportional to the intensity of the incident radiation without regard to the wavelength impinging thereon provided the impinging energy falls within the sensitivity region of the detector. This electrical signal output is proportional to the intensity of radiant energy impinging on the detector from all sources. In the prior art spectrophotometers, errors in sample transmittance readings result from extraneous radiation particularly if there are differing levels of extraneous radiation in the sample and reference beam paths. For example, if the temperature of the sample is elevated, the sample itself may radiate and, absent radiation from an external source, the radiant energy levels in the sample and reference beam path differ. During operation of the prior art systems when the detector is exposed to the reference beam path it responds only to radiation from the external source transmitted by the reference; however, when the detector is exposed to the sample beam path it responds not only to radiation from the external source transmitted by the sample but also to the radiation emitted by the sample. It may be seen readily that when these signals are ratioed the true transmittance value of the sample does not result.

Figure 1:
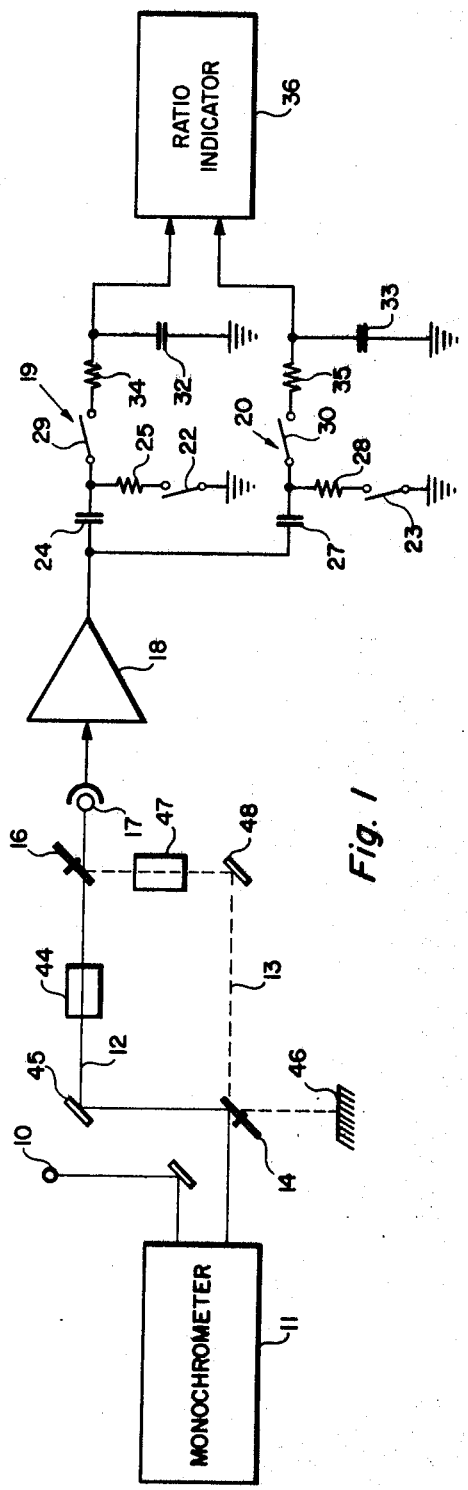
Figure 2B:
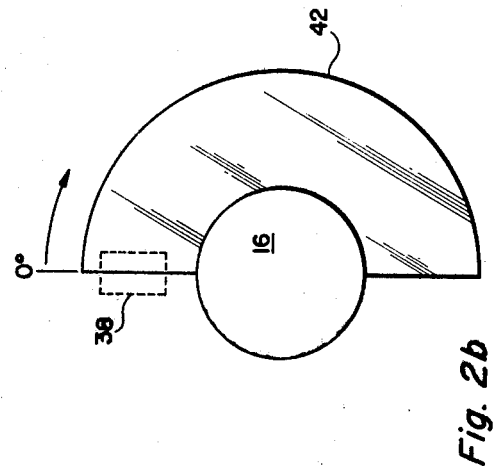
Figure 2A:
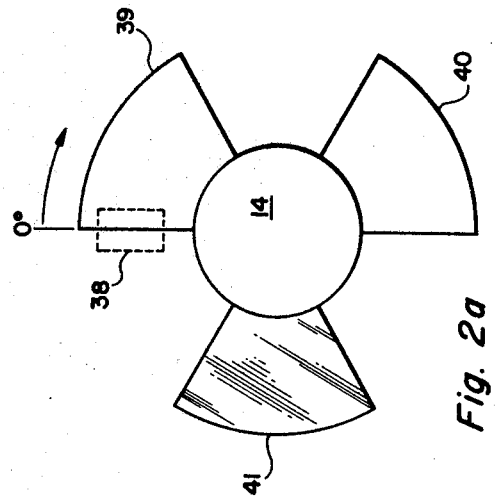
Figure 3:
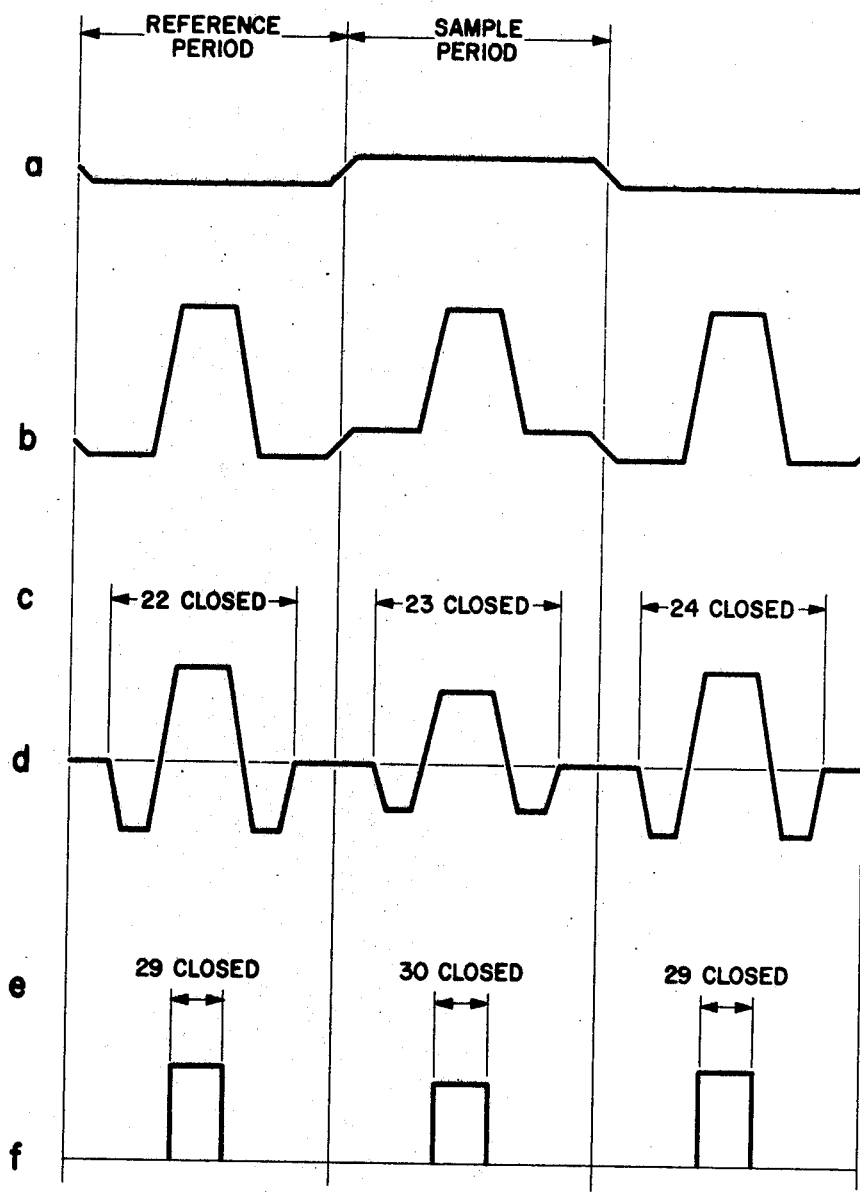

FIG. 1 is a schematic diagram of a double beam ratio recording spectrophotometer constructed in accordance with the teachings of this invention;

FIGS. 2a and 2b indicate respectively a beam switcher and a beam recombiner for use in the spectrophotometer of FIG. 1; and FIG. 3 illustrates various wave forms and switching sequences which occur in the spectrophotometer of FIG. 1.

Referring now to FIG. 1 radiation from source 10 after dispersion in monochromator 11 is directed alternately along a reference beam path 12 and a sample beam path 13 by beam switcher 14. Beam switcher 14 may be of the type providing radiant energy alternately along the reference and sample beam paths with dark intervals therebetween to provide time spaced alternate reference and sample beam pulses separated by dark periods. A beam recombinder 16 is arranged to recombine the reference and sample beam pulses along a common path to a radiant energy detector 17.

The output of detector 17 is an electrical signal having an instantaneous value proportional to the intensity of the radiation incident thereon. In the double beam spectrophotometer of the type just described the output of the detector is a series of alternate reference and sample signal pulses which appear as departures from a dark intervale signal level. The output of detector 17 after amplification at 18 is applied to an electrical reference signal channel 19 and a sample signal channel 20. Switches 22 and 23 sort the reference and sample signal pulses into their respective channels by connecting these channels to the detector during the reference and sample periods. For example, switch 22 is closed during the reference period while switch 23 remains open. Capacitor 24 is thus connected through resistor 25 to circuit ground and the reference signal pulse is passed by capacitor 24. Conversely, during the sample period switch 22 is open and switch 23 is closed and capacitor 27 in the sample signal channel is connected through resistor 28 to circuit ground. Switches 29 and 30 are utilized to demodulate the A.C. signal passing capacitors 24 and 27. Thus a D.C. signal proportional to the amplitude of the reference signal pulses is stored in the reference channel across capacitor 32 and a D.C. voltage proportional to the amplitude of the sample signal pulses is stored across capacitor 33 in the sample channel. Capacitor 32 in combination with resistor 34 acts as a filter in the reference channel to suppress unwanted spurious noise. Likewise, capacitor 33 together with resistor 35 forms a filter in the sample channel.

The D.C. signals across capacitors 32 and 33 may be applied to any suitable ratio indicator 36 which provides a ratio of the sample signal to tthe reference signal. This ratio may be indicated by any suitable means. The ratio indicator may conveniently comprise a potentiometric recorder which provides a record of sample transmittance as a function of wavelength if the recording chart is driven in synchronism with the scanning means of the monochromator.

Referring now to FIGS. 2a and 2b the beam switcher and beam recombiner are respectively illustrated in their relative phase positions as "seen" by the detector. The beam path or field of view of the detector is illustrated in phantom by rectangle 38 in each figure. The beam switcher 14 is a three segment device having a pair of masks 39 and 40 and a mirrored sector 41. Each of these sectors are 60° in width and are separated by open spaces of 60°. Beam switcher 14 rotates in a clockwise direction as indicated by the arrow.

Beam recombiner 16 is a rotating half mirror having a 180° mirrored sector 42 and is phased with respect to beam recombiner 14 as illustrated by the zero degree indicator. The beam recombiner also rotates in a clockwise direction as indicated by the arrow.

It is apparent that for the first 180° of the cycle from the point indicated as zero in FIGS. 2a and 2b mirror 42 of the beam recombiner is out of the field of view of the detector (except for a few degrees due to beam width) and the detector is exposed to the reference beam path. Considering beam switcher 14 an open area occurs for the first 60° of the cycle and the detector "sees" the reference cell 44, fixed mirror 45 and that portion of the instrument along the optical axis behind beam switcher 14 generally the side wall 46 of the instrument. During the next 60° mirror 41 is interposed in the field of view of detector 17 and radiant energy from an external source 10, after dispersion in the monochromator 11, traverses the reference beam path. During the next 60° mirror 41 has passed out of the optical axis and the reference beam path is the same as that during the first 60° period.

During the second 180° of the cycle mirror 42 of beam recombiner 16 is interposed in the field of view of detector 17 and the reference beam path 12 is blocked by the back side of this mirror. During the next 60° portion of the cycle, i.e., from 180° to 240° of rotation of both beam switcher 14 and beam recombiner 16, detector 17 "sees" mirror 42, sample cell 47, fixed mirror 48 and mask 40 of beam switcher 14. During the next 60° the open area between masks 40 and 39 of beam switcher 14 allows radiant energy from source 10 and monochromator 11 to traverse the sample beam path 13 and during the final 60° of the cycle the energy from the external source is blocked by mask 39 of beam switcher 14 and the detector "sees" mirror 42, sample cell 47, mirror 48 and mask 39.

Let it be presumed that a sample at an elevated temperature is placed in sample cell 47 and that the sample emits radiant energy in the wavelength sensitivity region of detector 17. With no energy from an external source, e.g., if we block source 10, FIG. 3a represents the output of detector 17 as a function of time. Since the sample is not present in reference cell 44, the radiant energy level in the sample beam path differs from that in the reference beam path and differing dark interval signal levels occur during the reference and sample periods. The ramp at the edges of the reference and sample periods is created by the edges of mirror 42 entering and leaving the field of view of detector 17.

If now source 10 is unblocked, FIG. 3b represents the output of detector 17 in somewhat idealized form.

FIG. 3c illustrates the timing of sorting switches 22 and 23 and FIG. 3d the signals across resistors 25 and 28. Switch 22 closes during the reference period and switch 23 during the sample period. The timing of these switches is such that the transient in the dark interval signal created by the hot sample at the introduction of mirror 42 into the beam path is chopped out of both signals. Since the dark current signal levels during the reference and sample periods appear to blocking capacitors 24 and 27, with this switching sequence, as a D.C. component, only that portion of the detector signal which represents the absolute height of the reference and sample pulses above their respective dark interval signal level is passed by these capacitors. The signals across resistors 25 and 28 are illustrated in FIG. 3d. Demodulators 29 and 30 select the positive portion of the signals across resistors 25 and 28 and FIG. 3f illustrates the reference and sample signal pulses stored across capacitors 32 and 33 respectively. It should be apparent that the amplitude of the reference and sample signals passing capacitors 24 and 27 is respectively proportional to the intensity of the radiant energy emitted by the external source which passes the reference and sample beam paths. Any extraneous radiation in either of these paths which is of a continuous nature and is not switched by both the beam switcher and beam recombiner is eliminated. Thus by this method the effects of a hot sample can be eliminated.

It should also be apparent that even in the absence of a hot sample the detector "sees" the instrument housing or other instrument parts 46 during the reference period and masks 39 and 40 of beam switcher 14 during the sample periods. If the temperature of these elements differs, different dark current signal levels may be produced by the detector even though all of these parts are painted with non-reflecting black paint. It should be apparent that the manner of beam switching and recombining and the operation of the switching sequence in the reference and sample channels compensates for any difference in temperature in the reference and sample beam paths which is continuously generated from a source of energy in either of these path other than the external source.

While the monochromator is illustrated as being between source 10 and beam switcher 14, it should be obvious that its position in the system is not critical and it could be positioned between the beam recombiner and detector 17 without affecting the operation of the system.

Obviously many modifications and variations of this invention are possible in light of the foregoing teachings and the specifically described embodiment is given by way of example only. It is to be understood, therefore, that the invention may be practiced otherwise than as specifically disclosed.

What is claimed is:

1. A spectrophotometer comprising:
   a radiant energy source;
   a radiant energy detector;
   reference and sample beam paths;
   beam switching means directing radiant energy from said source alternately along said reference and sample beam paths to provide time spaced reference and sample beam pulses, said reference and sample beam pulses being separated by dark intervals;
   beam recombining means exposing said detector alternately to said reference and sample beam paths in synchronism with said beam switching means, said detector exposed to respective paths for a period of time greater than said reference and sample beam pulses whereby said detector output is a series of alternate reference and sample signal pulses which appear as departures from dark interval signal levels that are respectively proportional to the radiant energy level in said reference and sample beam paths during said dark intervals;
   monochromator means positioned between said source and said detector for dispersing radiant energy and exposing said detector to a preselected wavelength passing said reference and sample beam paths;
   means connected to said detector and producing reference and sample signals proportional to the departure of said reference and sample signal pulses from their respective dark interval signal levels; and
   means connected to receive said reference and sample signals for indicating the ratio of said signals.

2. A spectrophotometer comprising:
   a radiant energy source;
   a radiant energy detector;
   reference and sample beam paths;
   means exposing said detector to said reference and sample beam paths alternately for selected periods of time;
   means directing radiation from said source alternately along said reference and sample beam paths in synchronism with said last named means for periods of time shorter than said selected periods whereby said detector output is a series of reference and sample signal pulses that appear as departures respectively from the radiant energy signal level in said reference and sample beam paths produced by radiant energy other than energy from said radiant energy source;

monochromator means positioned between said source and said detector for dispersing radiant energy and exposing said detector to a selected wavelength passing said reference and sample beam paths;

reference and sample signal channels;

sorting means respectively connecting said reference and sample signal channels to said detector when said detector is exposed to said reference and sample beam paths for sorting a portion of said detector output including the respective signal pulse and at least a portion of the signal level on each side of said pulse to respective signal channels to provide reference and sample signals proportional to the intensity of the radiation emitted by said source at said selected wavelength transmitted respectively by said reference and sample beam paths; and means indicating the ratio of said reference and sample signals.

3. A spectrophotometer comprising:

a radiant energy source;

a radiant energy detector;

reference and sample beam paths;

beam switching means directing radiant energy from said radiant energy source alternately along said reference and sample beam paths to provide time spaced reference and sample beam pulses, said reference and sample beam pulses being separated by dark intervals;

beam recombining means exposing said detector to said reference beam path during said reference beam pulse and for approximately one-half of each dark interval on each side of said pulse and exposing said detector to said sample beam path during said sample beam pulse and for approximately one-half of each dark interval on each side of said sample pulse whereby said detector output is a series of alternate reference and sample signal pulses which appear as departures from dark interval signal levels that are respectively proportional to the radiant energy level in said reference and sample beam paths during said dark intervals;

monochromator means positioned between said source and said detector for dispersing radiant energy from said radiant energy source and exposing said detector to a preselected wavelength emitted by said source;

reference and sample signal channels;

means connecting said reference and sample signal channels to said detector when said detector is exposed to said reference and sample beam paths respectively for sorting a portion of said detector output including the respective signal pulse and at least a portion of the signal level on each side thereof to respective signal channels to provide reference and sample signals proportional to the intensity of the radiant energy emitted by said source at said predetermined wavelength and transmitted respectively by said reference and sample beam paths; and means indicating the ratio of said reference and sample signals.

4. A spectrophotometer comprising:

a radiant energy source;

a radiant energy detector;

reference and sample beam paths;

beam switching means for directing radiant energy from said radiant energy source alternately along said reference and sample beam paths to provide time spaced reference and sample beam pulses separated by dark intervals, said beam switching means comprising a three sector chopper having a pair of masks and a reflecting sector, each sector separted by an open area;

beam recombining means exposing said detector alternately to said reference and sample beam paths in synchronism with said beam switching means, said beam recombining means comprising a rotating half mirror, the mirrored sector of said beam recombiner cooperating with said pair of masks and one of said open areas of said beam switching means whereby said detector output is a series of alternate reference and sample signal pulses separated by dark interval signal levels, the dark interval signal level adjacent each side of said signal pulses being respectively proportional to the radiant energy level in the path traversed by the respective pulse and produced by radiant energy other than energy from said radiant energy source;

monochromator means positioned between said source and said detector for dispersing radiant energy and exposing said detector to a selected wavelength passing said reference and sample beam paths;

reference and sample channel means;

means connecting said reference signal channel to said detector during said reference signal pulse and during at least a portion of its associated dark interval on each side thereof;

means connecting said sample signal channel to said detector during the sample signal pulse and during at least a portion of its associated dark interval signal on each side thereof;

capacitor means in each of said reference and sample signal channels for providing alternating current reference and sample signals having an absolute magnitude proportional to the intensity of the radiant energy emitted by said source at said predetermined wavelength transmitted respectively to said reference and sample beam paths;

demodulator means for providing direct current reference and sample signals having amplitudes proportional to the intensity of the radiant energy emitted by said source at said selected wavelength transmitted respectively by said reference and sample beam paths; and means indicating the ratio of said reference and sample signals.

References Cited

UNITED STATES PATENTS 3,207,996   9/1965   Sundstrom.
3,352,156   11/1967  Beitz _____ 88—22.5
3,381,135   4/1968   Keller.

RONALD L. WIBERT, Primary Examiner

V. P. McGRAW, Assistant Examiner

U.S. Cl. X.R.

356—97; 250—232

UNITED STATES PATENT OFFICE

CERTIFICATE OF CORRECTION

Patent No. 3,497,302        Date February 24, 1970

Donald G. Tipotsch

It is certified that error appears in the above-identified patent and that said Letters Patent are hereby corrected as follows:

Column 6, line 35, after "interval" insert --signal--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents